US010076127B2

(12) United States Patent
Cecava et al.

(10) Patent No.: US 10,076,127 B2
(45) Date of Patent: Sep. 18, 2018

(54) PROCESS FOR MODIFYING PROTEIN DIGESTION OF RUMINANT FEEDS AND PRODUCTS PRODUCED THEREFROM

(75) Inventors: Michael J. Cecava, Monticello, IL (US); Perry H. Doane, Decatur, IN (US); James L. Dunn, Decatur, IN (US)

(73) Assignee: Archer Daniels Midland Company, Decatur, IL (US)

( * ) Notice: Subject to any disclaimer, the term of this patent is extended or adjusted under 35 U.S.C. 154(b) by 79 days.

(21) Appl. No.: 13/516,763

(22) PCT Filed: Dec. 21, 2010

(86) PCT No.: PCT/US2010/061560
§ 371 (c)(1),
(2), (4) Date: Jun. 18, 2012

(87) PCT Pub. No.: WO2011/084794
PCT Pub. Date: Jul. 14, 2011

(65) Prior Publication Data
US 2012/0282388 A1     Nov. 8, 2012

Related U.S. Application Data

(60) Provisional application No. 61/288,656, filed on Dec. 21, 2009.

(51) Int. Cl.
*A23K 1/18*     (2006.01)
*A23K 50/10*    (2016.01)
(Continued)

(52) U.S. Cl.
CPC ............. *A23K 50/10* (2016.05); *A23K 10/12* (2016.05); *A23K 10/30* (2016.05); *A23K 10/33* (2016.05);
(Continued)

(58) Field of Classification Search
CPC ........ A23K 1/007; A23K 1/02; A23K 1/1813; A23K 1/14; A23K 1/06; A23K 1/1631;
(Continued)

(56) References Cited

U.S. PATENT DOCUMENTS

| 2,295,643 A | 9/1942 | Emery et al. |
| 3,492,398 A | 1/1970 | Marco et al. |

(Continued)

FOREIGN PATENT DOCUMENTS

| WO | WO 9428739 A1 * | 12/1994 | |
| WO | WO 9841110 A1 * | 9/1998 | ............. A23K 1/003 |
| WO | WO 03009702 A1 * | 2/2003 | ............. A23K 1/164 |

OTHER PUBLICATIONS

Barrett et al. Plant Foods for Human Nutr. 52:9-15, 1998.*
(Continued)

*Primary Examiner* — Chhaya Sayala
(74) *Attorney, Agent, or Firm* — Andrew F. Nilles

(57) ABSTRACT

Processes for increasing rumen undegraded protein in protein containing compositions, fermentation by-products or combinations thereof are disclosed. Uses of alkaline crystalline solids to increase rumen undegraded protein in protein containing compositions, fermentation by-products or combinations thereof are further disclosed. Products produced from such processes are also disclosed.

11 Claims, 4 Drawing Sheets

(51) Int. Cl.
*A23K 10/12* (2016.01)
*A23K 10/33* (2016.01)
*A23K 10/38* (2016.01)
*A23K 10/30* (2016.01)
*A23K 20/147* (2016.01)

(52) U.S. Cl.
CPC ............ *A23K 10/38* (2016.05); *A23K 20/147* (2016.05); *Y02P 60/871* (2015.11); *Y02P 60/873* (2015.11); *Y02P 60/877* (2015.11)

(58) Field of Classification Search
CPC ...... A23K 50/10; A23K 20/147; A23K 10/12; A23K 10/30; A23K 10/33; A23K 10/38; Y02P 60/871; Y02P 60/873; Y02P 60/877
USPC .................................................. 426/656, 807
See application file for complete search history.

(56) References Cited

U.S. PATENT DOCUMENTS

| | | | |
|---|---|---|---|
| 3,505,073 A * | 4/1970 | Bode ............................... | 426/48 |
| 4,194,012 A * | 3/1980 | Horiuchi ................ | A23K 10/32 426/52 |
| 4,225,620 A * | 9/1980 | Rawlings et al. ................. | 426/2 |
| 4,327,118 A * | 4/1982 | Georgen et al. .............. | 426/656 |
| 4,664,905 A | 5/1987 | Meyer | |
| 4,664,917 A * | 5/1987 | Meyer .................... | A23K 40/00 426/2 |
| 4,704,287 A | 11/1987 | Meyer | |
| 4,737,365 A | 4/1988 | Meyer | |
| 4,900,562 A | 2/1990 | Miller et al. | |
| 4,957,748 A | 9/1990 | Winowiski et al. | |
| 4,973,490 A | 11/1990 | Holmes et al. | |
| 5,023,091 A | 6/1991 | Winowiski et al. | |
| 5,064,665 A | 11/1991 | Klopfenstein et al. | |
| 5,185,174 A * | 2/1993 | Sawhill .......... | 426/583 |
| 5,496,572 A | 3/1996 | Rudden et al. | |
| 5,508,058 A | 4/1996 | Endres et al. | |
| 5,585,134 A * | 12/1996 | Cummings et al. .......... | 426/630 |
| 5,662,958 A * | 9/1997 | Kennelly et al. ............. | 426/630 |
| 5,714,185 A | 2/1998 | Hahadevan | |
| 5,789,001 A | 8/1998 | Klopfenstein et al. | |
| 5,824,355 A | 10/1998 | Heitritter et al. | |
| 5,885,640 A | 3/1999 | Anderson et al. | |
| 6,113,974 A | 9/2000 | Winowiski et al. | |
| 6,126,986 A * | 10/2000 | Harris et al. .................. | 426/658 |
| 6,221,380 B1 | 5/2001 | Woodroofe et al. | |
| 6,559,324 B2 | 5/2003 | Strohmaier et al. | |
| 7,618,672 B2 | 11/2009 | Corbin et al. | |
| 2003/0118690 A1* | 6/2003 | Bartle et al. ...................... | 426/2 |
| 2004/0234649 A1* | 11/2004 | Lewis et al. .................... | 426/31 |
| 2006/0036370 A1* | 2/2006 | St-Pierre .................. | A23K 1/04 702/19 |
| 2006/0045957 A1 | 3/2006 | Bevans et al. | |
| 2006/0204554 A1 | 9/2006 | Cecava et al. | |
| 2007/0098873 A1 | 5/2007 | Wilde et al. | |
| 2009/0291469 A1* | 11/2009 | David ..................... | C12N 1/18 435/69.1 |

OTHER PUBLICATIONS

Berger et al, Effect of Sodium Hydroxide on Efficiency of Rumen Digestion, Journal of Animal Science, 1979, 49:1317-1323, USA.
Bowman et al., Response of Dairy Cows in Early Lactation to Sodium Hydroxide-Treated Soybean Meal, Journal of Dairy Science, vol. 71, No. 4, 1988, pp. 982-989.
Mir et al., Methods for Protecting Soybean and Canola Proteins From Degradation in the Rumen, Canadian Journal of Animal Science, 64: pp. 853-865, Dec. 1984, Canada.
Mohammadabadi et al., The effect of formaldehyde or sodium hydroxide on In sittu rumen degradation of low and high fat sunflower mean, Research Journal of Biological Sciences 3 (9): pp. 1115-1118, 2008.
Nishino et al., Formation of Lysinoalanine Following Alkaline Processing of Soya Bean Meal in Relation to the Degradability of Protein in the Rumen, J. Sci Food Agric 1995, 68, pp. 59-64, Great Britain.
Nishino et al., Ruminal degradation of alfalfa protein as influenced by sodium hydroxide and heat treatment, Animal Feed Science and Technology 48, (1994), pp. 131-141.
Waltz et al., Effect of Acid and Alkali Treatment of Soybean Meal on Nitrogen Utilization by Ruminants, Journal of Animal Science, 1986, 63: 879-887.
Waltz et al., Evaluation of various methods for protecting soya-bean protein from degradation by rumen bacteria, Animal Feed Science and Technology, 25 (1989) pp. 111-122, The Netherlands.
USPTO, International Search Report, PCT/US10/61560, dated Feb. 17, 2011,pp. 1-2, USA.
USPTO, Written Opinion, PCT/US10/61560 dated Feb. 17, 2011,pp. 1-5, USA.
Hudson et al., Ruminal and Postruminal Nitrogen Utilization by Lambs Fed Heated Soybean Meal, American Society of Animal Science, 1970, 30: 609-613.

* cited by examiner

PROCESS FOR MODIFYING PROTEIN DIGESTION OF RUMINANT FEEDS AND PRODUCTS PRODUCED THEREFROM

CROSS-REFERENCE TO RELATED APPLICATIONS

This application is a national stage entry of International Application No. PCT/US10/61560, filed Dec. 21, 2010, which itself claims priority to U.S. Provisional Patent Application No. 61/288,656, filed Dec. 21, 2009, each of the contents of the entirety of which are incorporated by this reference.

TECHNICAL FIELD

The present invention relates to animal feed compositions and methods for increasing production in a ruminant animal by slowing rumen fermentation of protein and thereby increasing post-rumen availability of protein and amino acids to the ruminant animal.

BACKGROUND OF THE INVENTION

Ruminant species are able to effectively utilize dietary ingredients that are poorly used by monogastric species. This occurs because ruminants can ferment dietary ingredients in the reticulo-rumen compartment of their complex ruminant stomach. Digestion of protein in the rumen has long been recognized as an important factor in the productive efficiency of ruminant diet formulation.

Ruminants meet their energy and protein requirements by a combination of rumen fermentation and digestion of protein that has escaped rumen fermentation. The production of protein and energy by rumen fermentation versus rumen escape followed by intestinal digestion and absorption varies widely among feedstuffs. The feed value of a dietary ingredient can also vary with animal productivity levels and/or animal diet formulation or composition.

As animal productivity levels increase, so do the nutritional requirements for amino acids, metabolizable protein and energy. At low productivity levels, nutritional requirements are more readily satisfied by rumen fermentation products. At elevated productivity levels, the gross efficiency of rumen nutrient digestion decreases. At such times, protein synthesis by rumen fermentation may not meet the animal's demands for metabolizable protein. This shortfall of rumen protein production increases the demand for rumen bypass protein. The bypass protein may then be metabolized by the post-rumen portions of the ruminant digestive system.

Research on increased productivity levels in ruminants has focused on the quantity and the quality of nutrients that escape rumen fermentation. The rumen escape of protein may be accomplished by processing dietary ingredients, thereby altering the physical structure of the protein therein and decreasing rumen fermentation, or by influencing rumen conditions so that the rumen bypass protein content of all dietary ingredients is increased.

As production levels in ruminant animals continue to increase, there are also increased requirements for metabolizable protein and amino acids. While dietary formulations increasing rumen bypass protein content in animal feed stuffs exist, there remains a demand for improved animal feeds that provide further increased levels of protein that escape rumen fermentation.

SUMMARY OF THE INVENTION

In one embodiment, a process for increasing rumen undegraded protein in an animal feed comprises mixing a protein containing composition, fermentation by-product or combination thereof with an alkaline crystalline solid, thus producing a composition; and subjecting the composition to a condition such that the alkaline crystalline solid reacts with water and generates heat. In such process, the protein containing composition, the fermentation by-byproduct or the combination thereof has an increased amount of rumen undegraded protein after the alkaline crystalline solid reacts with the water.

In another embodiment, an animal feed composition comprises a protein containing composition having at least a portion of amino groups of amino acids of the protein containing composition reacted with a carbonyl group of a sugar; and calcium hydroxide, magnesium hydroxide or a combination thereof.

DETAILED DESCRIPTION OF THE INVENTION

Figure 1:
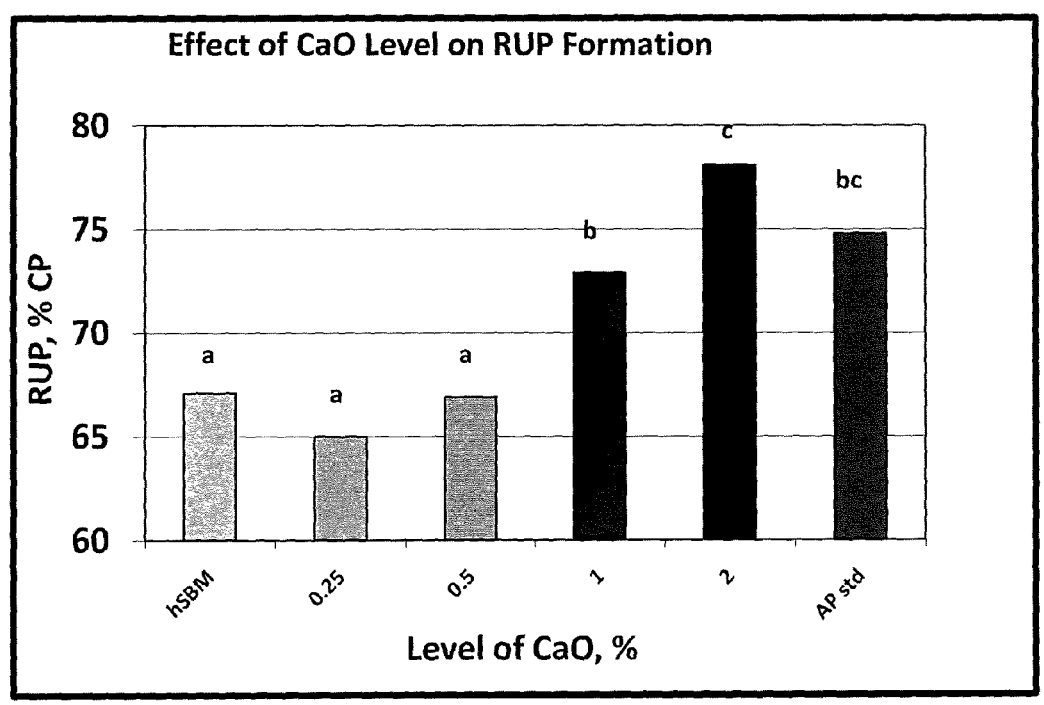
FIG. 1 shows the amount of rumen undegraded protein in one embodiment of the present invention.

In one embodiment, the present invention is directed towards improved animal feed compositions which increase the amount of proteinaceous matter that passes through the rumen of a ruminant animal, thus increasing the amount of proteinaceous matter available for post-rumen digestion.

Processes of producing animal feed compositions according to the various non-limiting embodiments set forth herein are also disclosed. Various methods for bypassing rumen protein digestion and increasing production in a ruminant animal are also disclosed.

In one non-limiting embodiment, the present invention comprises an improved animal feed composition comprising at least one of a proteinaceous feed, a fermentation by-product, a compound eliciting alkaline pH formation or any combination thereof. The compositions of this non-limited embodiment may be treated with moist heat. Such improved compositions increase the amount of protein passing through the rumen and into the latter parts of the digestive tract in a ruminant upon feeding the ruminant the improved composition as compared to a non-improved moist heat treated animal feed composition.

The present invention is based on the discovery that a chemical reaction can be used to treat animal feed compositions comprising proteinaceous feedstuffs and/or fermentation by-products have increased amounts of proteinaceous matter that escape fermentation within the rumen. In embodiment, the chemical reaction is catalyzed by a compound or combinations of alkaline crystalline solids. Such compounds or alkaline crystalline solids include, but are not limited to alkaline crystalline solids of calcium oxide, magnesium oxide, lime, alkaline metal percarbonates, sodium percarbonate, alkaline metal perborates, a percarbonate or combinations of any thereof. The use of the compound may enable the control of pH and facilitate disrupting the fiber matrix of the proteinaceous feedstuff and/or fermentation by-product. A surprising observation is the potential to use alkaline crystalline solids to control pH as compared to the use of liquid caustic agents, such as sodium hydroxide. Also, the chemical reaction initiated by the methods of the present invention may be elicited under low-moisture conditions such as, for example, with no more than 10% water added to the composition. Thus, the chemical reaction may enable a process that produces a product higher in rumen undegraded protein while using less water, and thus, less cost. Additionally, since the chemical reaction is exothermic, a lower heat may be used to create the product higher in rumen undegraded protein for further cost savings.

Alkaline crystalline solids that may be used include, but are not limited to compounds containing an ionic bond between a mineral element and one oxygen atom. Such alkaline crystalline solids are hygroscopic in nature and are characterized by a vigorous reaction with water, thus forming hydroxide ions. The hydroxide forms in the presence of water such as by the following reaction: $CaO+H_2O \rightarrow Ca(OH)_2$, but such formation may be reversed by heating to separate moisture. Non-limiting examples of alkaline crystalline solids include, but are not limited to, calcium oxide, magnesium oxide, lime and combinations of any thereof.

Alkaline crystalline solids have a wide variety of industrial and agricultural uses. Such alkaline crystalline solids may be used: in water and sewage treatment to reduce acidity, to soften, as a flocculant or to remove phosphates or other impurities; in paper making to dissolve lignin, as a coagulant and in bleaching; in agriculture to improve acid soils; and in pollution control in gas scrubbers to desulfurize waste gases or to treat liquid effluents. The alkaline crystalline solids may also be used in pottery, paints and the food industry, where the alkaline crystalline solids are used in conjunction with water to heat items like MREs (meals ready to eat) and coffee.

As used herein, the term "proteinaceous matter" includes any material comprising proteins that may be fed to an animal. Examples of suitable proteinaceous matter include, but are not limited to, vegetable proteins, soybean meal, corn meal, linseed meal, cottonseed meal, canola meal, alfalfa leaf meal, the meal of any grain edible to animals, milk based feedstuffs, cheese containing products, fermentation by-products and mixtures of fermentation by-products, fermentation biomasses and mixtures of fermentation biomasses, and combinations of any thereof.

In one embodiment, the fermentation by-products or fermentation biomasses may be of eukaryotic or prokaryotic origin. As used herein, the term "fermentation by-product" includes any by-product left over from a fermentation process. The fermentation by-product or fermentation biomass may comprise the cell mass of a fermentation and/or the media on which the cell mass was grown and may comprise the enzyme system of the viable organism and its concomitant metabolites produced during the fermentation process and not removed during the separation process. Non-limiting examples of fermentations from which the fermentation by-product or biomass may be obtained include, but are not limited to ethanol fermentation, lactic acid fermentation, amino acid fermentation, astaxanthin fermentation, citric acid fermentation, fungal fermentation, yeast fermentation or bacterial fermentation. In other embodiments, the fermentation by-product or biomass may comprise a lysine cell mass, a threonine cell mass, a threonine mother liquor, a lactic acid biomass, a lysine biomass, a citric acid biomass, a *Corynebacterium* cell mass such as *Corynebacterium glutamicum*, an *Escherichia* cell mass such as *Escherichia coli*, a *Rhizopus* cell mass such as *Rhizopus oryzae*, a *Pichia* cell mass such as *Pichia guilliermondii*, a *Yarrowia* cell mass, a *Lactobacilli* cell mass or by-product, a *Saccharomyces* cell mass or by-product such as *Saccharomyces cerevisiae*, a *Yarrowia* cell mass or by-product, a *Kluyveromyces* cell mass or by-product, a *Torulaspora* cell mass or by-product, or combinations of any thereof.

In another embodiment, a system for producing the animal feed products may include equipment configured to perform the processes of the present invention. The compositions of the present invention may be processed or treated with moist heat to increase the content of rumen undegraded protein in ruminant feed compositions as compared to ruminant feed compositions that have not been treated with moist heat. One moist heat treatment process is disclosed in U.S. Pat. No. 5,824,355, which is hereby incorporated by reference, or modifications thereof such as a moist low-heat pre-treatment. In another embodiment, a simplified moist-heat treatment may be obtained by using a desired moisture content and using steam and/or liquid in combination with a pelleting or conditioning process used in feed manufacturing. The moisture content may be adjusted using steam, water or water-containing liquid in order to achieve the desired moisture content.

The proteinaceous matter and/or fermentation by-product may be digested or metabolized in the post-rumen portions of the ruminant digestive system, thereby providing further increased energy and protein levels for ruminant animals during times of increased productivity. Compositions and methods of manufacture of the compositions of the embodiments of the present disclosure are disclosed. In addition, methods of bypassing rumen protein digestion and increasing production of a ruminant animal, comprising feeding the animal the compositions of the embodiments of the present disclosure, are also disclosed.

Other than in the operating examples, or where otherwise indicated, all numbers recited herein expressing quantities of ingredients, reaction conditions and the like are to be understood as being modified in all instances by the term "about". Accordingly, unless indicated to the contrary, the numerical parameters set forth in the following specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, may inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

Any patent, publication, or other disclosure material, in whole or in part, that is identified herein is incorporated by reference herein but only to the extent that the incorporated material does not conflict with existing definitions, statements, or other disclosure material set forth in this disclosure. As such, and to the extent necessary, the disclosure as set forth herein supersedes any conflicting material incorporated herein by reference. Any material, or portion thereof, that is incorporated by reference herein, but which conflicts with existing definitions, statements, or other disclosure material set forth herein will only be incorporated to the extent that no conflict arises between that incorporated material and the existing disclosure material.

In certain embodiments of the present disclosure, compositions may be processed or treated with the induced chemical reaction to increase the content of rumen undegraded protein in ruminant feed compositions when compared to ruminant feed compositions that have not been processed or treated with the chemical reaction.

Without intending to be limited to a particular mechanism for the embodiments of the present disclosure, it is believed that the ingredient may affect the reaction of proteins with sugars via a Maillard-type reaction, thereby slowing the digestion of protein in the rumen and increasing the quantity of protein matter that passes at least partially intact into the post-rumen portions of the ruminant digestive system.

The Maillard reaction, also known as non-enzymatic browning, involves the thermal reaction between an aldose or a ketose and alpha-amino acids or amino acid residues in proteins to afford a resulting Schiff base. The Schiff base residues may undergo subsequent rearrangement to form a more stable structure known as the Amadori product. Further reaction may lead to the formation of indigestible melanoidins (D. W. S. Wong, Food Chemistry and Biochemistry, in Encyclopedia of Food Science and Technology, 2nd ed., F. J. Francis, ed., Wiley & Sons, 2000, vol. 2, pp 877-880). Utilization of the early stages of the Maillard reaction leads to amino acid or protein residues that are protected from fermentation within the rumen microflora environment and therefore tend to escape fermentation in the rumen to be metabolized in the post-rumen portions of the ruminant digestive system.

Suitable fermentation by-product sources for use in certain non-limiting embodiments of the present disclosure include, but are not limited to, ethanol presscakes, such as presscakes of brewer's yeast or baker's yeast (*Saccharomyces cerevisiae*), distiller's yeast biomasses, propagated yeast biomass, citric acid presscakes, biomasses from lactic acid fermentations, biomasses from bacterial fermentations, and biomasses from amino acid fermentations and mixtures of any thereof.

As used herein, the term "presscake" means the filtered or centrifuged cell mass obtained from separation of the broth and cell mass. The presscake may optionally be dried before forming the composition.

In the various non-limiting embodiments of the present disclosure comprising a fermentation by-product, the fermentation by-product may comprise from 0.50% up to 99%, by weight, of the composition. In certain non-limiting embodiments, the biomass dry matter may comprise from 0.25% to 5.00% of the composition by weight based on dry weight of the composition. In other non-limiting embodiments, the biomass may comprise from 0.50% to 2.30% of the composition by weight based on dry weight of the composition. In various non-limiting embodiments the biomass may be added to the composition as a wet biomass. According to the embodiments wherein a wet biomass is added to the composition, the wet biomass is added in quantities from 2.5% of the total added moisture to 35% of the total added moisture. According to various non-limiting embodiments, the total added moisture may vary from 10% total added moisture to 45% total added moisture. In certain non-limiting embodiments, the total moisture may be from 10% to 25% and the wet biomass added in an amount from 2.5% to 25%.

The animal feed comprising the ingredient and at least one proteinaceous feed ingredient may comprise a proteinaceous feed ingredient, such as, plant and vegetable proteins, including edible grains and grain meals selected from the group consisting of soybeans, soybean meal, corn, corn meal, linseed, linseed meal, cottonseed, cottonseed meal, rapeseed, rapeseed meal, sorghum protein, and canola meal. Other examples of proteinaceous feed ingredients may include; corn or a component of corn, such as, for example, corn fiber, corn hulls, corn stover, silage, ground corn, or any other portion of a corn plant; soy or a component of soy, such as, for example, soy hulls, soy silage, ground soy, or any other portion of a soy plant; wheat or any component of wheat, such as, for example, wheat fiber, wheat hulls, wheat chaff, ground wheat, wheat germ, or any other portion of a wheat plant; canola or any other portion of a canola plant, such as, for example, canola protein, canola hulls, ground canola, or any other portion of a canola plant; sunflower or a component of a sunflower plant; sorghum or a component of a sorghum plant; sugar beet or a component of a sugar beet plant; cane sugar or a component of a sugarcane plant; barley or a component of a barley plant; corn steep liquor; a waste stream from an agricultural processing facility; soy molasses; flax; peanuts; peas; oats; forage grasses and legumes, such as orchard grass, fescue, and alfalfa leaf meal, alfalfa, and clover used for silage or hay, and various combinations of any of the feed ingredients set forth herein.

In yet another embodiment when the proteinaceous ingredient is of a rapeseed or canola origin, the process of the present invention was found to surprisingly reduce the amount of glucosinolates and/or secondary metabolites thereof such as thiocyanates in the resulting animal feed. Since such glucosinolates and secondary metabolites thereof such as thiocyanates are anti-nutritional, the reduction of such compounds is beneficial.

Other embodiments of the methods of feeding an animal may further comprise forming the animal feed composition into a form selected from the group consisting of a treated protein, a protein supplement, and a treated feed. According to certain embodiments where the animal feed composition may be in the form of a protein supplement, wherein the supplement is in a form selected from the group consisting of a meal, a pellet, a block, a tub, a premix, a top-dress, an additive, and a liquid feed supplement.

According to other embodiments, feeding the ruminant the animal feed composition may comprise feeding the ruminant the composition in the form of a supplement in an amount of 0.454 kg/head/day to 3.18 kg/head/day. According to certain embodiments wherein the animal feed composition is in the form of a premix, feeding a ruminant the animal feed composition may comprise feeding the ruminant the premix in an amount of 0.09 kg/head/day to 0.454 kg/head/day. In another embodiment, the feed composition may be a compound feed and fed to a ruminant in an amount of between 3.18 kg/head/day to 10 kg/head/day.

According to the various embodiments of the process, the composition may be any for suitable for consumption by the animal, for example, a form selected from the group consisting of a meal, a pellet, a block, a tub, a premix, a top-dress, an additive, and a liquid feed supplement. According to certain embodiments, the composition is in the form of a meal. According to other embodiments, the composition is in the form of a pellet.

The process according to certain embodiments may further comprise placing the composition in a container configured for shipping and associating indicia with the container. The indicia may comprise pictures and/or symbols and words capable of directing a user, for example, on the origin of the composition, brand name of the composition, and/or on how to administer the composition to an animal. Other embodiments of the process may comprise shipping the container, for example, shipping by one or more of truck, airplane, train and/or boat.

The various methods and compositions of the non-limiting embodiments of the present disclosure may be fed directly to ruminant animals or added to the ruminant animal's feed as a feed supplement or additive. Ruminant animals which may be fed the compositions of the present disclosure include, but are not limited to, bovines, ovines, and caprines.

The methods according to the various non-limiting embodiments of the present disclosure contemplate feeding the compositions disclosed herein to a ruminant animal, wherein the composition has a physical form as described below. According to these non-limiting embodiments, the physical form of compositions within the present disclosure may be any suitable formulation known in the feed art. For example, suitable formulations include, but are not limited to, treated proteins and feeds, such as, for example, soybean meal, and as a protein supplement in the form of a meal, pellet, block, cube, liquid supplement or feed, agglomeration, premix/additive, mineral, meal, a cooked tub, and a pressed tub formulation. In one non-limiting embodiment, the methods and compositions may comprise a protein supplement with a physical formulation of a meal or pellet formulation that is suitable for direct consumption or as an additive to feed. In another non-limiting embodiment, the physical formulation used in the methods and compositions may comprise a premix that may be admixed into the animal feed prior to consumption by the ruminant.

According to the various non-limiting embodiments of the methods and compositions herein, the amount of the compositions of the present disclosure that may be consumed by the animal varies depending on one or more factors, including, but not limited to, one or more of animal species, age, size, sex, health and production levels. In one non-limiting embodiment, wherein the composition is in the form of a meal or pelletized protein supplement, the method may comprise feeding the compositions of the present disclosure to a ruminant in an amount of from 0.454 kg to 3.18 kg per head per day (kg/head/day) (1.0 to 7.0 lbs/head/day). In another non-limiting embodiment, wherein the composition is utilized as a premix, a non-limiting method may comprise adding the compositions of the present disclosure to animal feed, such that the amount of the compositions consumed by the ruminant is from 0.0454 to 0.454 kg/head/day (0.1 lbs to 1.0 lbs/head/day). In another non-limiting embodiment, the method comprises adding the composition in an amount such that the amount of compositions consumed by the ruminant is from 0.091 kg to 0.136 kg/head/day (0.2 to 0.3 lbs/head/day).

The invention is further explained by use of the following exemplary embodiments.

EXAMPLES

The following examples illustrate various non-limiting embodiments of the compositions within the present disclosure and are not restrictive of the invention as otherwise described or claimed herein. Unless otherwise noted, all percentage values are weight percentage. Unless otherwise noted, rumen undegraded protein content of compositions were determined by weighing the compositions into porous dacron bags and incubating the bags in the rumens of lactating dairy cows for a period of sixteen hours. The protein content of the residue remaining after such incubation was defined as the rumen undegraded protein fraction of the composition.

Example 1

In this example, the rumen bypass content of soybean meal treated with calcium oxide (CaO) was determined. Samples of soybean meal were mixed for three minutes in a small Hobart mixer with varying amounts of calcium oxide and 25% water (vol/wt). Once mixed, the soybean meal/calcium oxide mixtures were weighed into 8"×8" glass dishes, covered with aluminum foil, and placed into a 105° C. oven for four hours. After the four hours, the foil was removed, the soybean meal/calcium oxide mixtures were weighed, transferred to a 50° C. oven, dried to 12% moisture and evaluated for rumen undegraded protein content. The calcium oxide was added to the soybean meal samples at 0, 0.25, 0.5, 1.0 and 2.0% on a wt/wt dry matter basis, and all samples were produced on two separate days.

Figure 2:
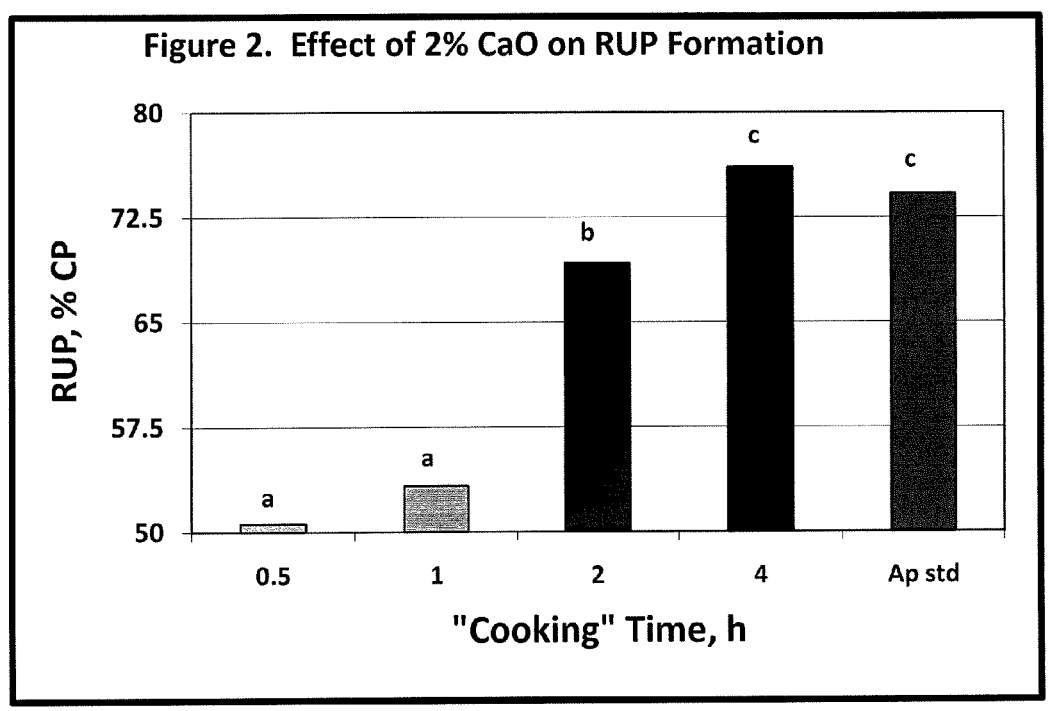
FIG. 2 shows the amount of rumen undegraded protein in another embodiment of the present invention.

The results of the calcium oxide treatment on the production of rumen undegraded protein are presented in FIG. 1. There was a linear pattern of increased rumen undegraded protein with increased calcium oxide addition. The inclusion of 1 and 2% calcium oxide increased rumen undegraded protein above the moist heat treatment by itself. The rate of rumen undegraded protein appeared to increase slightly with 2% calcium oxide, with a significant increase in rumen undegraded protein after two hours at 105° C. and the rumen undegraded protein values exceeded the standard after four hours as shown in FIG. 2.

Example 2

In another example, the rumen bypass content of soybean meal treated with calcium oxide, sodium percarbonate and a combination of calcium oxide and sodium percarbonate was determined. Samples of soybean meal were mixed for three minutes in a small Hobart mixer with the following treatments: 1% calcium oxide and 25% water (vol/wt); 1% sodium percarbonate and 25% water (vol/wt); and a combination of 0.5% calcium oxide/0.5% sodium percarbonate and 25% water (vol/wt). Once mixed, the soybean meal mixtures were weighed into 8"×8" glass dishes, covered with aluminum foil, and placed into a 105° C. oven for four hours. After the four hours, the foil was removed, the soybean meal mixtures were weighed, transferred to a 50° C. oven, dried to 12% moisture and evaluated for rumen undegraded protein content.

Figure 3:
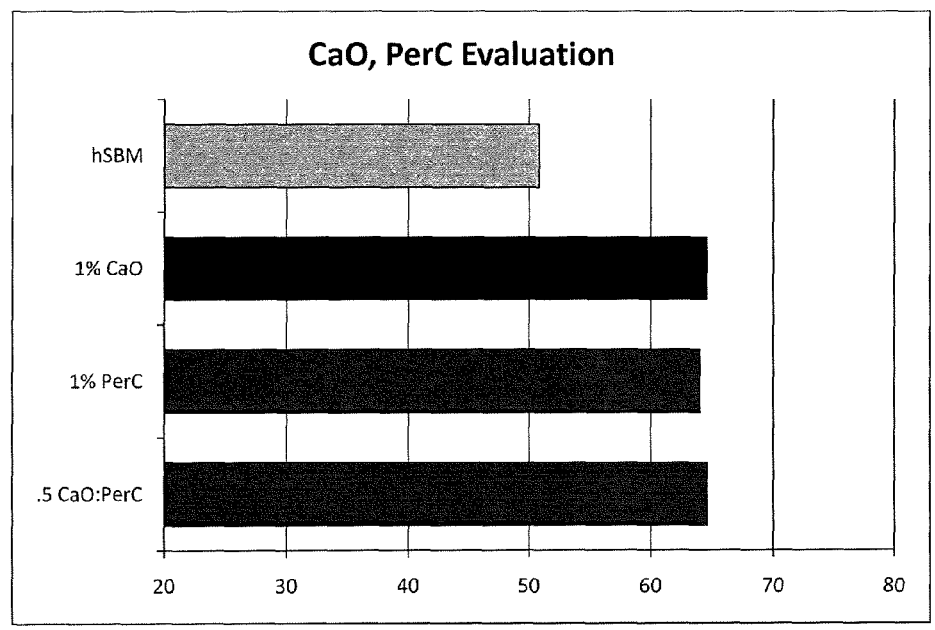
FIG. 3 shows the amount of rumen undegraded protein in an additional embodiment of the present invention.

FIG. 3 shows the effects of the treatments on rumen undegraded protein. Each of the 1% calcium oxide treatment, the 1% sodium percarbonate treatment or the combination thereof increased the amount of rumen undegraded protein in the soybean meal as compared to the heated soybean meal (hSBM).

Example 3

The effects of calcium oxide on the formation of rumen undegraded protein in soybean meal and canola meal was evaluated. Samples of soybean meal or canola meal were mixed for three minutes in a small Hobart mixer with the following treatments; 0.5% calcium oxide and 25% water (vol/wt); 0.5% calcium oxide and 15% water (vol/wt); 1.0% calcium oxide and 25% water (vol/wt); 1.0% calcium oxide and 15% water; 2.0% calcium oxide and 25% water (vol/wt); 2.0% calcium oxide and 15% water. Once mixed, the soybean meal or canola meal mixtures were weighed into 8"×8" glass dishes, covered with aluminum foil, and placed into a 105° C. oven for four hours. After the four hours, the foil was removed, the soybean meal and canola meal mixtures were weighed, transferred to a 50° C. oven, dried to 12% moisture and evaluated for rumen undegraded protein content.

Figure 4:
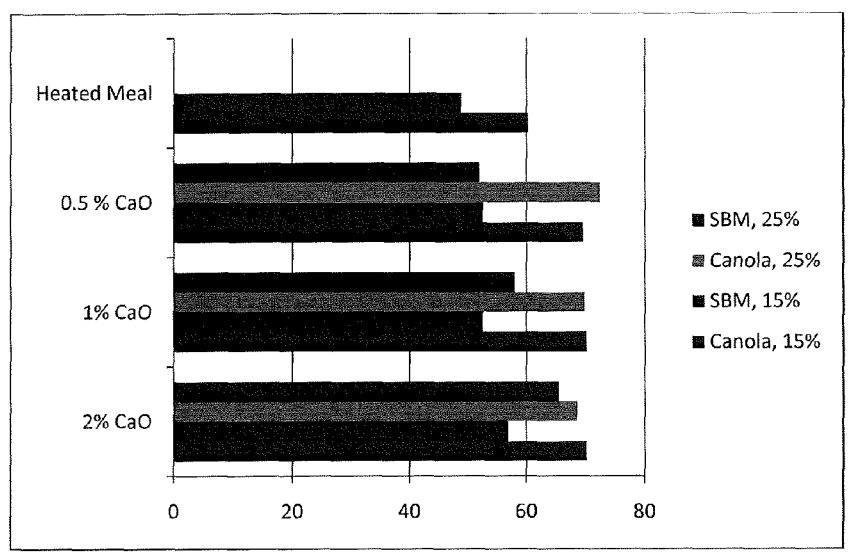
FIG. 4 shows the amount of rumen undegraded protein in yet a further embodiment of the present invention.

The amount of rumen undegraded protein is shown in FIG. 4. For soybean meal, rumen undegraded protein content increased with increasing concentration of calcium oxide and increased more so for 25% water as compared to 15% water. Undegraded protein content of canola meal was enhanced by the lowest addition of calcium oxide and treatments having 15% water were equal to treatments having a greater water content of 25%.

Example 4

The effects of calcium oxide on the formation of rumen undegraded protein in canola meal and soybean meal was evaluated.

Calcium oxide (lime) was mixed with soybean meal and canola meal at the levels indicated in Table 1, and distilled water was added as needed at the levels indicated in Table 1. The soybean meal or canola meal and calcium oxide compositions were mixed for three minutes in a Hobart mixer. The soybean meal or canola meal and calcium oxide compositions were weighed and placed into 8"×8" glass dishes, covered with aluminum foil and placed into a 105° C. oven for four hours. After four hours, the foil was removed, the soybean meal or canola meal and calcium oxide compositions were weighed, transferred to a 50° C. oven and dried to 12% moisture as estimated by weight loss.

TABLE 1

Evaluation of calcium oxide (CaO) and moisture on rumen undegraded protein (RUP) formation in canola and soybean meals. RUP is expressed as a % of CP.

| | Soybean Meal Added Water (wt/wt) | | Canola Meal Added Water (wt/wt) | |
|---|---|---|---|---|
| CaO added, % wt/wt | 15% | 25% | 15% | 25% |
| 0 | | 47.5 | | 60.3 |
| 0.50 | 53.2 | 50.0 | 69.0 | 72.4 |
| 1.0 | 52.6 | 58.0 | 70.2 | 69.8 |
| 2.0 | 56.9 | 65.5 | 70.2 | 76.3 |
| 3.0 | | | | 76.4 |

The dried soybean meal or canola meal and calcium oxide compositions were incubated in the rumen to measure rumen undegraded protein (RUP) content. The bypass values in Table 1 represent an evaluation of a single sample for each treatment. Soybean meal and canola meal samples were produced and in situ evaluation were performed on separate days.

As indicated in Table 1, calcium oxide increased bypass protein formation during moist-heat treatment. The effect appeared to plateau at 1% calcium oxide addition for canola meal when 15% water was added but additional rumen undegraded protein content was observed with 2% calcium oxide when moisture was 25%. For soybean meal, increasing to 2% calcium oxide resulted in greater undegraded protein formation and particularly so with 25% added water.

Example 5

The effects of calcium oxide and/or yeast on the formation of rumen undegraded protein in canola meal and soybean meal were evaluated.

*Saccharomyces cerevisiae* yeast ("LeSaffre yeast") was used as a positive control in this Example. Each treatment of this Example was adjusted to a 25% moisture addition. The LeSaffre yeast was suspended in distilled water for delivering yeast solids at 0.5 and 1% of the oilseed meals on a dry basis. Calcium oxide was added at 1 and 2% on a wt/wt basis, singly and in combination with yeast solids. Table 2 indicates the amounts of canola meal, soybean meal, yeast solids and calcium oxide used in this Example. The soybean meal or canola meal and calcium oxide and/or yeast compositions were mixed for three minutes in a Hobart mixer. The soybean meal or canola meal and calcium oxide and/or yeast compositions were weighed and placed into 8"×8" glass dishes, covered with aluminum foil and placed into a 105° C. oven for four hours. After four hours, the foil was removed, the soybean meal or canola meal and calcium oxide and/or yeast compositions were weighed, transferred to a 50° C. oven and dried to 12% moisture as estimated by weight loss.

TABLE 2

Evaluation of calcium oxide (CaO) and yeast on rumen undegraded protein (RUP) formation in canola and soybean meals. RUP is expressed as a % of CP.

| | Canola Yeast solids addition, wt/wt | | | | SBM Yeast solids addition, wt/wt | | | |
|---|---|---|---|---|---|---|---|---|
| CaO, wt/wt | 0 | 0.5% | 1% | Ave | 0 | 0.5% | 1% | Ave |
| 0 | 60.3 | 78.2 | 71.9 | 70.1 | 48.1 | 75.2 | 76.9 | 66.7 |
| 1% | 69.8 | 75.1 | 71.7 | 72.2 | 58.0 | 68.6 | 66.1 | 64.2 |
| 2% | 76.6 | 75.6 | 79.8 | 77.3 | 65.5 | 62.9 | 58.7 | 62.4 |
| Ave | 68.9 | 76.3 | 74.5 | | 57.2 | 68.9 | 67.2 | |

The dried soybean meal and canola meal and/or yeast solids and/or calcium oxide compositions were ruminally incubated to measure rumen undegraded protein (RUP) content. The results are presented in Table 2. As seen in Table 2, yeast or calcium oxide improved the formation of rumen undegraded protein in both the canola meal and the soybean meal.

Example 6

The effects of the use of an alkaline agent (CaO) or oxidizing agents (sodium percarbonate, hydrogen peroxide) on the feed value of moist-heat processed rapeseed meal was evaluated. In this example, the formation of rumen bypass protein was increased while the amount of anti-nutritional secondary compounds (glucosinolates, thiocyanates etc.).

Samples of rapeseed meal were mixed for 3 minutes in a small Hobart mixer with treatments (as appropriate) with 25% water (vol/wt) added unless otherwise indicated. The protein meal mixtures were weighed into 8"×8" glass dishes the samples covered with aluminum foil, and placed into a 105° C. oven for 4 hours. After 4 hours, the foil was removed, samples weighed, transferred to a 50° C. oven, and dried to 12% moisture as estimated by weight loss. Analysis of glucosinolates and secondary metabolites thereof such as thiocyanates were performed according to HPLC, AOCS Official Method Ak 1-92. The results of such analysis are shown in Table 3. Bypass protein was determined by incubating samples in-situ for 16 hours within the rumens of 3 beef heifers and determination of residual protein.

TABLE 3

| Name | Progoitrin mg/kg | Sinigrin mg/kg | Gluconapin mg/kg | 4-Hydroxy glucobrassicin mg/kg | Glucotropaeolin mg/kg | Total Glucosinolates g/100 g |
|---|---|---|---|---|---|---|
| Rapeseed meal unprocessed | 91 | 2960 | 11256 | 307 | 345 | 1.50 |
| Rapeseed meal moist-heat procesessed 25% moisture | 72 | 2419 | 10074 | 36 | 240 | 1.28 |
| Rapeseed meal 25% moisture, 1% CaO | 0 | 40 | 211 | 1 | 4 | 0.03 |
| Rapeseed meal 25% moisture, 1% percarbonate | 69 | 2250 | 9822 | 17 | 232 | 1.24 |
| Rapeseed meal 25% moisture, 0.5% CaO, 0.5% PerC | 48 | 1400 | 6882 | 4 | 128 | 0.85 |
| Rapeseed meal 25% moisture, 0.3% peroxide | 62 | 2011 | 9125 | 12 | 191 | 1.14 |
| Rapeseed meal 25% moisture, 0.5% peroxide | 71 | 2389 | 10281 | 16 | 232 | 1.30 |
| Rapeseed meal 25% moisture, 0.75% peroxide | 17 | 495 | 2562 | 0 | 40 | 0.31 |
| Rapeseed meal >25% moisture, 1% peroxide | 38 | 1171 | 5445 | 0 | 90 | 0.67 |

Figure 5:
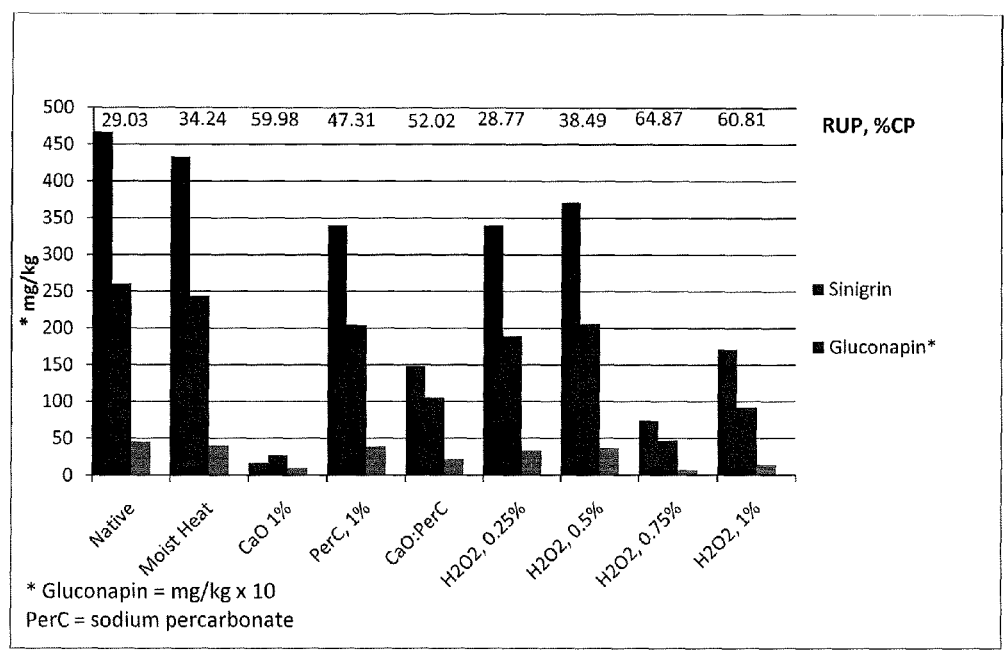
FIG. 5 shows the effect of moist heat treatment with CaO, percarbonate or peroxide on thiocynates and nitriles in rapeseed meal in one embodiment of the present invention.

Efficacy of calcium oxide (lime), sodium percarbonate and hydrogen peroxide were compared in terms of both RUP formation and reduction of rapeseed secondary compounds. Calcium oxide, and sodium percarbonate were added at 1% of the rapeseed meal on a wt/wt basis, and water added at 25% (vol/wt). Hydrogen peroxide was added at 0.3, 0.5, 0.75 and 1% to rapeseed meal and moisture adjusted to reach 25% water addition. Calcium oxide, sodium percarbonate (singly and in combination) and the higher levels of hydrogen peroxide increased RUP formation from the moist-heat process as shown in FIG. 5. There were reductions in the secondary metabolites present in the rapeseed meal from moist-heat processing. Percarbonate and hydrogen peroxide reduced secondary compounds, but to a smaller extent as compared to the calcium oxide. The decrease in thiocyanates and nitriles present in rapeseed meal was pronounced with addition of calcium oxide, with levels reduced to about 10% of the unprocessed meal.

Although the foregoing description has necessarily presented a limited number of embodiments of the invention, those of ordinary skill in the relevant art will appreciate that various changes in the components, details, materials, and process parameters of the examples that have been herein described and illustrated in order to explain the nature of the invention may be made by those skilled in the art, and all such modifications will remain within the principle and scope of the invention as expressed herein in the appended claims. It will also be appreciated by those skilled in the art that changes could be made to the embodiments described above without departing from the broad inventive concept thereof. It is understood, therefore, that this invention is not limited to the particular embodiments disclosed, but it is intended to cover modifications that are within the principle and scope of the invention, as defined by the claims.

What is claimed is:

1. A process for increasing rumen undegraded protein in an animal feed comprising:
    mixing water with a yeast biomass;
    adding the water and the yeast biomass to a composition comprising canola meal, soybean meal, or a combination thereof and an alkaline crystalline solid selected from the group consisting of lime, calcium oxide, and a combination thereof, such that the composition has a moisture content of between 8-35% by weight and the alkaline crystalline solid reacts with the water and generates heat;
    mixing the composition; and
    heating the composition to a temperature of at least 100° C.;
    wherein the canola meal, the soybean meal, or the combination thereof has an increased amount of rumen undegraded protein after the alkaline crystalline solid reacts with the water;
    wherein the canola meal comprises at least 60% rumen undegraded protein and the-soybean meal comprises at least 55% rumen undegraded protein.

2. The process of claim 1, further comprising subjecting the composition to increased pressure.

3. The process of claim 1, wherein the process results in the reduction of glucosinolates and/or secondary metabolites thereof in the canola meal.

4. The process of claim 1, wherein the composition further comprises cotton seed meal.

5. The process of claim 1, wherein the composition consists of the water, the yeast biomass, and the canola meal, the soybean meal, or the combination thereof.

6. A process for increasing rumen undegraded protein in an animal feed comprising:
    mixing a composition comprising canola meal, cottonseed meal, water, a yeast biomass, and an alkaline crystalline solid selected from the group consisting of calcium oxide, and combinations thereof, such that the alkaline crystalline solid reacts with the water and generates heat;

heating the composition to a temperature of at least 100° C.; and drying the composition;

wherein the canola meal and the cottonseed meal has an increased amount of rumen undegraded protein after the alkaline crystalline solid reacts with the water;

wherein the composition comprising the canola meal and the cottonseed meal comprises at least 60% rumen undegraded protein.

7. The process of claim 6, further comprising:

heating the composition in a device to a first temperature; and subjecting the composition to a second temperature that is lower than the first temperature;

wherein the first temperature is the highest temperature of the process.

8. The process of claim 7, further comprising removing the composition from the device.

9. The process of claim 6, wherein the increased amount of rumen undegraded protein in the canola meal is between 69.0-76.6% expressed as a percentage of crude protein (CP).

10. A process for increasing rumen undegraded protein in an animal feed comprising:

mixing a composition consisting of soybean meal, canola meal, cotton seed meal, water, a yeast biomass, and an alkaline crystalline solid selected from the group consisting of calcium oxide, lime, and combinations thereof wherein the composition has a moisture content of between 8-35% by weight and the alkaline crystalline solid reacts with the water and generates heat;

heating the composition with steam;

wherein the soybean meal, the canola meal, and the cotton seed meal have an increased amount of rumen undegraded protein after the alkaline crystalline solid reacts with the water;

wherein the composition comprising the soybean meal, the canola meal, and the cotton seed meal comprises at least 55% rumen undegraded protein.

11. The process of claim 10, wherein the increased amount of rumen undegraded protein in the soybean meal is between 50.0-65.5% expressed as a percentage of crude protein (CP).

* * * * *